United States Patent
Ohhashi (10) Patent No.: US 8,082,461 B2
(45) Date of Patent: Dec. 20, 2011

(54) IMAGE FORMING APPARATUS AND CONTROL METHOD OF IMAGE FORMING APPARATUS

(75) Inventor: Naoya Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 527 days.

(21) Appl. No.: 12/275,520

(22) Filed: Nov. 21, 2008

(65) Prior Publication Data

US 2009/0144573 A1    Jun. 4, 2009

(30) Foreign Application Priority Data

Nov. 30, 2007  (JP) ................. 2007-310207

(51) Int. Cl.
*G06F 1/00* (2006.01)
*G06F 1/32* (2006.01)

(52) U.S. Cl. ........ 713/324; 713/300; 713/320; 713/323; 713/330

(58) Field of Classification Search .................. 713/300, 713/310, 320, 330, 323, 324; 358/1.1, 1.2, 358/1.13
See application file for complete search history.

(56) References Cited

FOREIGN PATENT DOCUMENTS

| JP | 07061095 A | * | 3/1995 |
| JP | 08063051 A | * | 3/1996 |
| JP | 2002-268471 | | 9/2002 |
| JP | 2003-89254 | | 3/2003 |
| JP | 2005-94679 | | 4/2005 |

* cited by examiner

*Primary Examiner* — Thomas J Cleary
(74) *Attorney, Agent, or Firm* — Oblon, Spivak, McClelland, Maier & Neustadt, L.L.P.

(57) ABSTRACT

An image forming apparatus includes a printing unit, a controlling unit, and a monitoring unit to monitor, while the printing unit and the controlling unit are in a power-saving mode in which power supply to the printing unit and the controlling unit is stopped, whether there is a resuming factor for resuming operation from the power-saving mode. When the resuming factor is detected, the monitoring unit sends to the printing unit a request to resume operation and a request to set a printing mode, before sending a request to resume operation to the controlling unit.

9 Claims, 8 Drawing Sheets

IMAGE FORMING APPARATUS AND CONTROL METHOD OF IMAGE FORMING APPARATUS

BACKGROUND OF THE INVENTION

1. Field of the Invention

The present invention relates to an image forming apparatus such as a fax machine, a printer, a copier, and a multifunction peripheral, and a control method of the image forming apparatus.

2. Description of the Related Art

There are conventional techniques for controlling a power-saving mode of an image forming apparatus such as a fax machine, a printer, a copier, and a multifunction peripheral. For example, an ASIC including a programmable sequencer configuring a programmable control circuit with which the power supply can be controlled, is used to perform control operations for switching/returning to a power-saving status and to monitor a network during a power-saving status, and to return to the regular operation mode from a power-saving status via a network I/F (for example, see patent documents 1 and 2).

A power-saving mode is achieved as follows. That is, a power-saving status is implemented in accordance with the status of the image forming apparatus by stopping the power from the power supply to the engine and the main CPU. The engine is used for forming toner images based on image data, printing the toner images onto sheets, and ejecting the sheets with the printed images to the outside. The main CPU controls the entire apparatus and printing operations. When it is necessary to use the engine and the main CPU, the mode returns to a regular power feeding status, so that the engine and the main CPU can be operated.

Furthermore, the following technique has been proposed (see, for example, patent document 3) to enhance the effects of power conservation in the power-saving mode. Specifically, an ASIC is provided separately from the main CPU for returning from the power-saving status, in which the power supply to the main CPU is stopped, to the regular operation mode, via a network. Thus, the ASIC can operate while the power supply to the main CPU is stopped, so that when there is access via the network, the main CPU can return to the regular operation mode from the power-saving mode.

Patent Document 1: Japanese Laid-Open Patent Application No. 2002-268471
Patent Document 2: Japanese Laid-Open Patent Application No. 2003-89254
Patent Document 3: Japanese Laid-Open Patent Application No. 2005-94679

However, in the above conventional techniques, when both the engine and the main CPU are in a power-saving mode, and both need to return to the regular operation mode, the following operation is performed. First, the main CPU returns to the regular operation mode, and then the main CPU causes the engine to return to the regular operation mode. When the engine receives power and becomes activated, the engine starts communications with the main CPU (referred to as "RAPI communications"), in order to set various modes and perform the printing operation. Thus, it takes a long time until the first sheet can be copied in a copying operation, for example. This degrades the convenience for the user.

SUMMARY OF THE INVENTION

The present invention provides an image forming apparatus and a control method of the image forming apparatus, in which one or more of the above-described disadvantages are eliminated.

A preferred embodiment of the present invention provides an image forming apparatus capable of quickly returning from a power-saving mode to a status where the apparatus is ready for performing printing, and a control method of the image forming apparatus.

According to an aspect of the present invention, there is provided an image forming apparatus including a printing unit configured to print an image onto a recording sheet based on image data; a controlling unit configured to control a print execution process for the printing unit and to control all units of the image forming apparatus; and a monitoring unit configured to monitor, while the printing unit and the controlling unit are in a power-saving mode in which power supply to the printing unit and the controlling unit is stopped, whether there is a resuming factor for resuming operation from the power-saving mode, wherein the monitoring unit includes a requesting unit configured to send, to the printing unit, a request to resume operation and a request to set a printing mode, before sending a request to resume operation to the controlling unit, in the event that the resuming factor is detected.

According to an aspect of the present invention, there is provided an image forming apparatus including a printing unit configured to print an image onto a recording sheet based on image data; and a controlling unit configured to control a print execution process for the printing unit and to control all units of the image forming apparatus, wherein while the controlling unit is operating but the printing unit is in a power-saving mode in which power supply to the printing unit is stopped, the controlling unit monitors whether there is a resuming factor for resuming operation from the power-saving mode, and sends, to the printing unit, a request to resume operation and a request to set a printing mode, in the event that the resuming factor is detected.

According to an aspect of the present invention, there is provided a control method performed by an image forming apparatus including a printing unit configured to print an image onto a recording sheet based on image data, and a controlling unit configured to control a print execution process for the printing unit and to control all units of the image forming apparatus, the control method including a monitoring step of monitoring, while the printing unit and the controlling unit are in a power-saving mode in which power supply to the printing unit and the controlling unit is stopped, whether there is a resuming factor for resuming operation from the power-saving mode; and a requesting step of sending, to the printing unit, a request to resume operation and a request to set a printing mode, before sending a request to resume operation to the controlling unit, in the event that the resuming factor is detected at the monitoring step.

According to one embodiment of the present invention, there is provided an image forming apparatus capable of quickly returning from a power-saving mode to a status where the apparatus is ready for performing printing, and a control method of the image forming apparatus.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
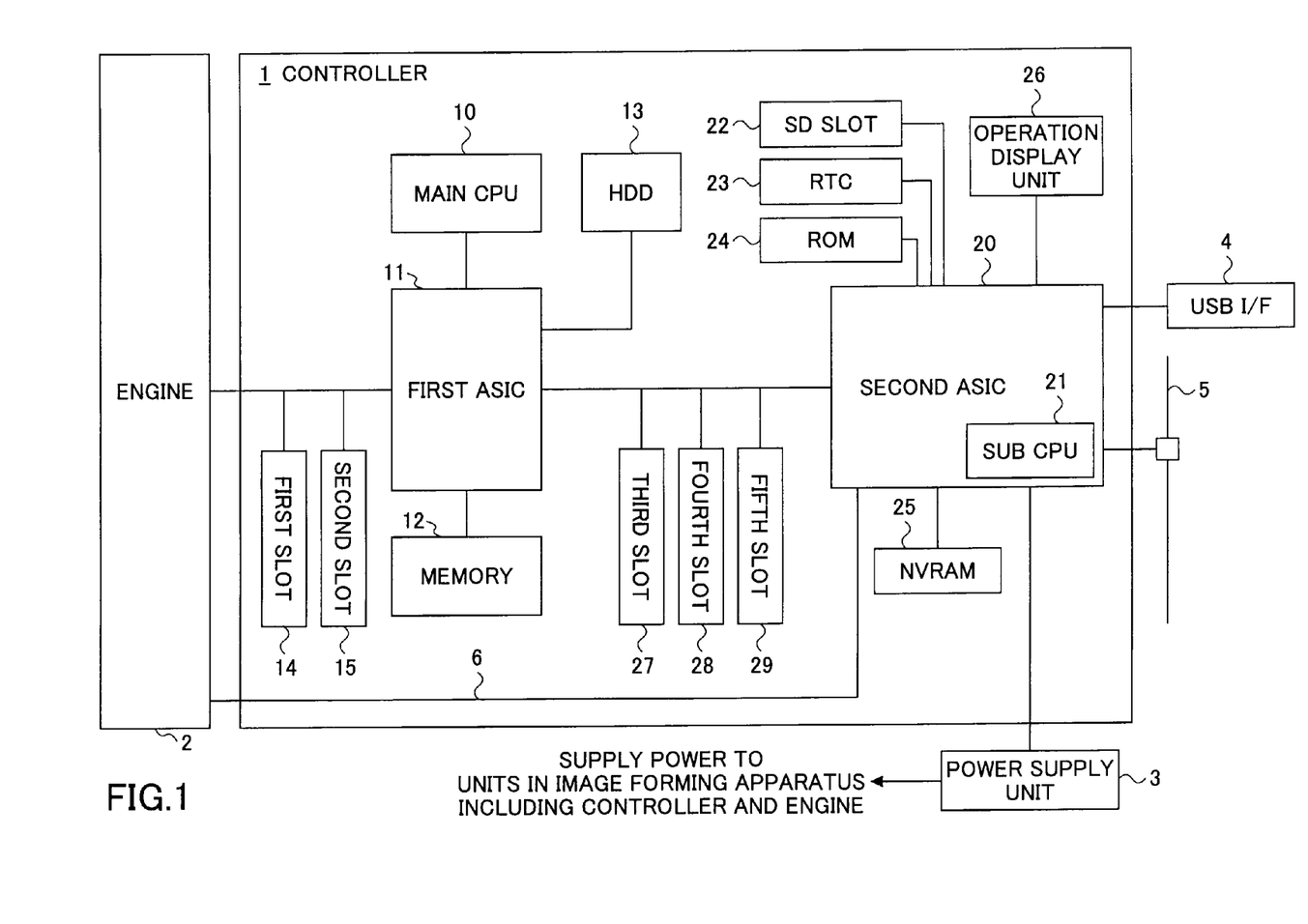
FIG. 1 is a block diagram of a functional configuration of an image forming apparatus according to an embodiment of the present invention.

FIG. 1 is a block diagram of a functional configuration of an image forming apparatus according to an embodiment of the present invention.

The image forming apparatus is a multifunction peripheral with various functions including a fax communication function, a print function, and a copy function. The image forming apparatus includes a controller 1 for controlling the entire image forming apparatus, an engine 2 for performing the printing operation, a power supply unit 3 for supplying power to various units in the image forming apparatus including the controller 1 and the engine 2, and a USB interface (I/F) 4 for controlling data communications with a USB device connected thereto. The image forming apparatus performs fax communications or data communications via a network 5.

The controller 1 includes a main CPU 10 for controlling the entire image forming apparatus, a first ASIC 11 for controlling memories and functioning as a connection bus between the engine 2, a memory (MEM) 12 to be used as an image buffer and a program work area, a hard disk device (HDD) 13 for storing image data, and a first slot 14 and a second slot 15 used as extension slots of the engine 2 side.

The main CPU 10 corresponds to a control unit for controlling the entire apparatus and the printing process executed by the printing unit, and also corresponds to a unit for monitoring, while the image forming apparatus is operating but is in the power-saving mode in which power to the printing unit is stopped, whether there is a factor (resuming factor for resuming operation) for returning to a regular operation mode from the power-saving mode, and for requesting the printing unit to return to the regular operation mode and set modes in the event that the resuming factor has been detected.

Furthermore, the controller 1 includes a second ASIC 20 including a sub CPU 21 which is for the power-saving mode, the sub CPU 21 for monitoring whether there is a resuming factor while units including the main CPU 10 and the engine 2 are in the power-saving mode, an SD slot 22 including an SD card for booting a program to perform data communication, a real time clock (abbreviated as "RTC") 23 used as a system clock, a ROM 24 which is an area for storing programs executed by the main CPU 10 and the sub CPU 21, an NVRAM 25 which is a non-volatile memory for storing various information items, an operation display unit 26 which is a user interface for receiving user-input operation information and for displaying information pertaining to the image forming apparatus, and a third slot 27, a fourth slot 28, and a fifth slot 29 used as extension slots of the controller 1 side.

That is, the sub CPU 21 corresponds to a monitoring unit for monitoring whether there is a resuming factor during the power-saving mode in which power to the printing unit and the control unit is stopped.

Furthermore, the second ASIC 20 and the sub CPU 21 are directly electrically connected to the engine control unit of the engine 2 by a signal line 6 so that communications can be performed therebetween. Thus, when the sub CPU 21 resumes operation from the power-saving mode in response to a Power Management CTL Signal, the sub CPU 21 can directly instruct the engine 2 to resume operation and request the engine 2 to make various mode settings when it resumes operation.

The engine 2 causes the image forming apparatus to perform an image forming operation including the following steps. An exposing unit forms an electrostatic latent image on a photoconductor, which is an image carrier that rotates in a sub scanning direction, by radiating light onto the photoconductor (uniformly charged beforehand by a charging device) in accordance with image data. A developing unit causes toner to adhere to the electrostatic latent image to form a toner image. A transfer unit transfers the toner image onto a sheet which is a recording medium. A fixing unit, which includes a fixing roller with a built-in heater and a pressurizing roller, applies heat and pressure to the sheet in order to fix the toner image onto the sheet. Then, the sheet with the fixed image is ejected outside the apparatus.

That is, the engine 2 corresponds to the printing unit for printing an image onto a recording sheet based on image data.

The power supply unit 3 of the image forming apparatus has four power supplying modes, as described below.

1. Standby Mode

Only the RTC 23 is operated by a button battery. After the power of the apparatus is turned on, the apparatus is activated, and power is supplied from the power supply unit 3 to all of the units in the apparatus, i.e., all units inside the controller 1, the engine 2, and the USB I/F 4.

2. Shutdown Mode

Only the RTC 23 is operated by a button battery. Power from the power supply unit 3 is not supplied to any of the other units in the apparatus, i.e., to any of the units inside the controller 1 other than the RTC 23, or to the engine 2 or the USB I/F 4.

3. Power-Saving Mode in Engine-Off Status (Hereinafter, Referred to as "Engine-Off Mode")

Only the RTC 23 is operated by a button battery. Power from the power supply unit 3 is supplied to all units inside the controller 1, but not to the engine 2.

4. Power-Saving Mode in Suspend to RAM (STR) Status (Hereinafter, Referred to as "STR Mode")

Only the RTC 23 is operated by a button battery. Power from the power supply unit 3 is supplied to the memory 12, the second ASIC 20, and the sub CPU 21 in the controller 1. However, power from the power supply unit 3 is not supplied to the other units in the controller 1 (units other than the memory 12, the second ASIC 20, and the sub CPU 21), or to the engine 2.

Next, a description is given of a process of switching to the STR mode performed by the image forming apparatus.

Figure 2:
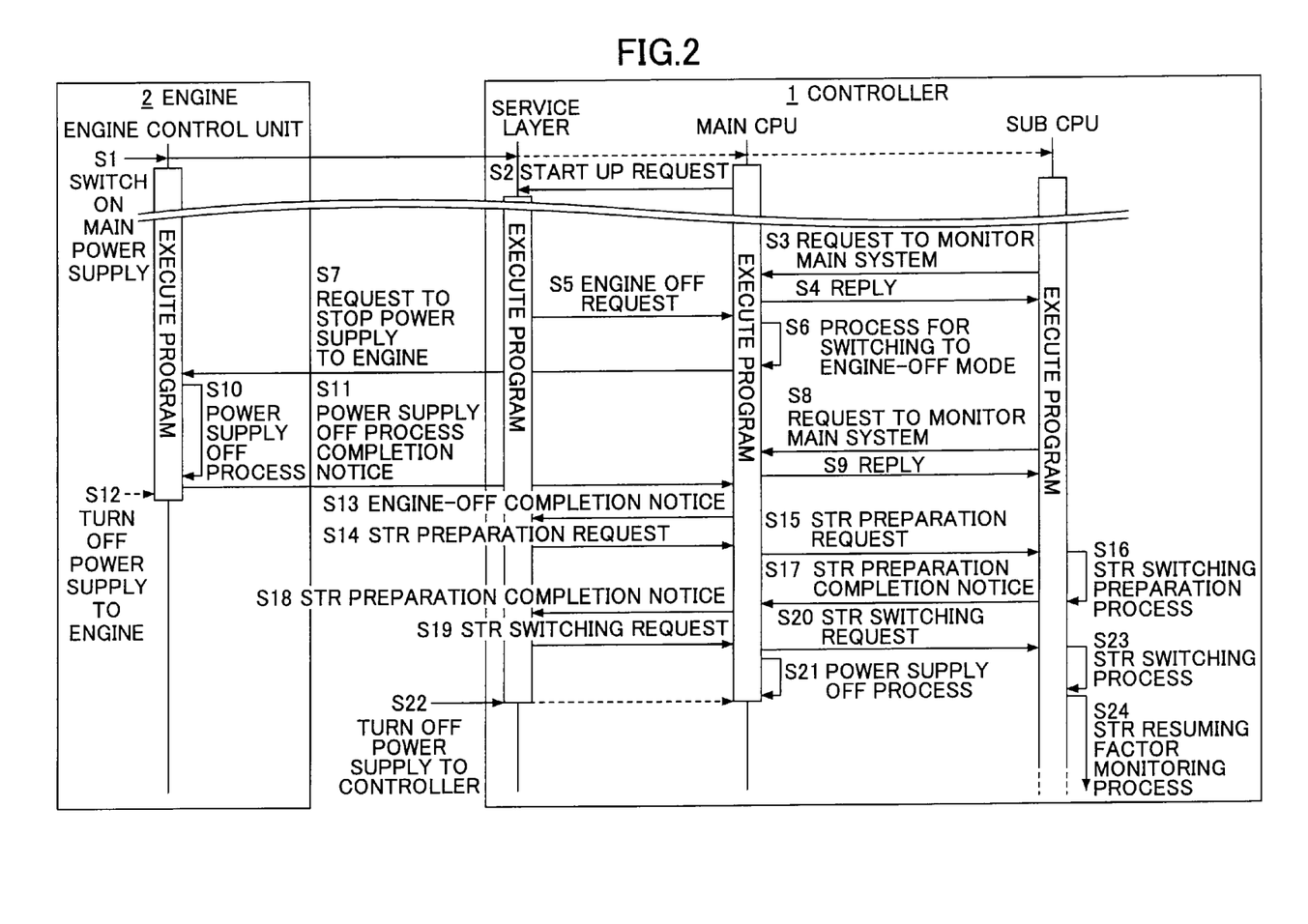
FIG. 2 is a sequence diagram of a process of switching to an STR mode performed by the image forming apparatus shown in FIG. 1.

FIG. 2 is a sequence diagram of the process of switching to the STR mode performed by the image forming apparatus shown in FIG. 1.

In step (denoted by "S" in the figure) 1, when power supply is received from the power supply unit 3 as the main power of the image forming apparatus is switched on, the engine control unit of the engine 2 executes a program and starts up, and similarly, in the controller 1, the main CPU 10 executes a program and starts up, and the second ASIC 20 executes a program and starts up together with the sub CPU 21 provided therein.

When the main CPU 10 has started up, in step 2, a start up request is sent to a service layer, whereby the service layer operates as the main CPU 10 executes an application program of an upper layer. The service layer executes a program and starts up in response to the start up request.

In step 3, the sub CPU 21 sends, to the main CPU 10, a request for periodically monitoring the main system controlled by the main CPU 10 at predetermined timings, and in step 4, the main CPU 10 returns a reply to the request from the sub CPU 21.

In step 5, when there is no operation made at the operation display unit 26 or there is no printing request from the network 5 after a certain time has elapsed after turning on the power supply, the service layer sends an engine off request to the main CPU 10, based on the operation status of the image forming apparatus. In step 6, the main CPU 10 starts a process for switching to an engine-off mode. In step 7, in the process for switching to the engine-off mode, the main CPU 10 sends a request to the engine control unit of the engine 2 for stopping the power supply to the engine 2.

In step 8, the sub CPU 21 once again sends, to the main CPU 10, a request for periodically monitoring the main system controlled by the main CPU 10 at predetermined timings, and in step 9, the main CPU 10 returns a reply to the request from the sub CPU 21.

When the engine control unit receives, from the main CPU 10, the request for stopping the power supply to the engine 2, in step 10, the engine control unit executes a power supply off process. In step 11, the engine control unit sends a power supply off process completion notice to the main CPU 10. In step 12, the engine control unit turns off the power supply from the power supply unit 3 to the engine 2, and the image forming apparatus switches to the engine-off mode.

When the power supply off process completion notice is received from the engine control unit, the main CPU 10 sends an engine-off completion notice to the service layer in step 13.

Next, the service layer receives the engine-off completion notice from the main CPU 10. When there is no operation made at the operation display unit 26 or there is no access from the network 5 after a certain time has elapsed after receiving the engine-off completion notice, in step 14, the service layer sends an STR preparation request to the main CPU 10 to switch to the STR mode. In step 15, the main CPU 10 sends an STR preparation request to the sub CPU 21. In step 16, the sub CPU 21 executes an STR switching preparation process.

When the sub CPU 21 completes the STR switching preparation process, in step 17, the sub CPU 21 sends an STR preparation completion notice to the main CPU 10. In step 18, the main CPU 10 sends an STR preparation completion notice to the service layer. In step 19, the service layer sends an STR switching request to the main CPU 10. In step 20, the main CPU 10 sends an STR switching request to the sub CPU 21. In step 23, the sub CPU 21 executes an STR switching process.

In step 21, the main CPU 10 executes a power supply off process. In step 22, when the power supply is turned off, the power supply from the power supply unit 3 to the main CPU 10 and the service layer is stopped, whereby the image forming apparatus switches to an STR mode.

When the image forming apparatus has switched to an STR mode, in step 24, the main CPU 10 starts an STR resuming factor monitoring process. Based on time information acquired from the RTC 23, the main CPU 10 measures the time that has elapsed after switching to the STR mode, and monitors whether there is a resuming factor for resuming operation from the power-saving mode.

A resuming factor for resuming operation from the power-saving mode is, for example, a print request operation made at the operation display unit 26 or a print request received from outside via the network 5.

Next, a description is given of a process of resuming operation from the engine-off mode in the image forming apparatus.

Figure 3:
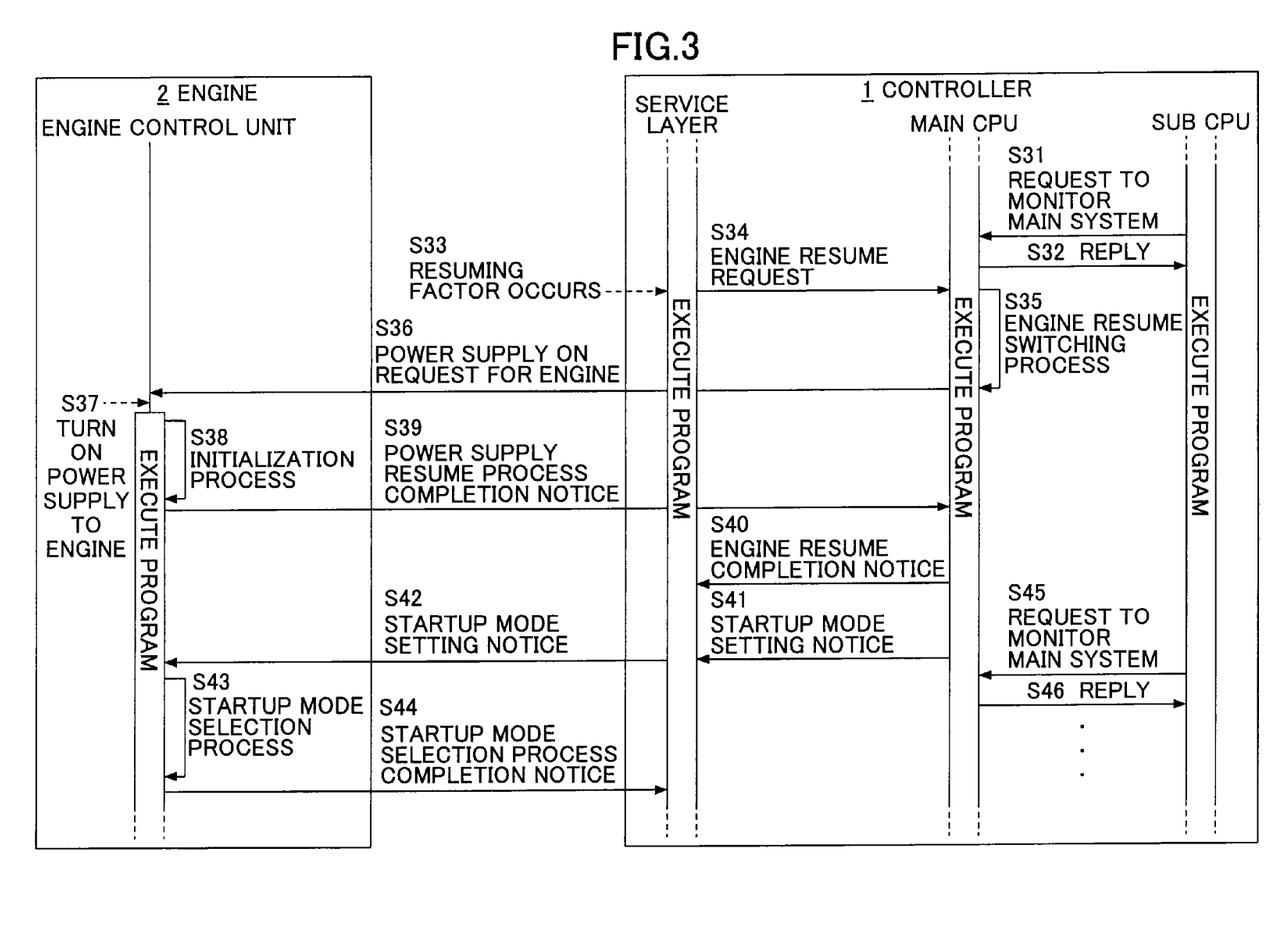
FIG. 3 is a sequence diagram of a process of resuming operation from an engine-off mode performed by the image forming apparatus shown in FIG. 1.

FIG. 3 is a sequence diagram of the process of resuming operation from the engine-off mode performed by the image forming apparatus shown in FIG.

In the above process, after switching to the engine-off mode and before switching to the STR mode, in step 31, the sub CPU 21 once again sends, to the main CPU 10, a request for periodically monitoring the main system controlled by the main CPU 10 at predetermined timings, and in step 32, the main CPU 10 returns a reply to the request from the sub CPU 21.

In step 33, when the service layer detects a resuming factor for resuming operation from the engine-off mode, for example, when the service layer detects that a print request has been made at the operation display unit 26, the platen cover (cover of the exposure glass) for setting an original has been opened/closed, or a sheet has been inserted into the ADF, in step 34, the service layer sends an engine resume request to the main CPU 10 for making the engine 2 return to the regular operation mode from the engine-off mode. In step 35, the main CPU 10 executes an engine resume switching process for making the engine 2 return to the regular operation mode from the engine-off mode. In step 36, the main CPU 10 sends, to the engine control unit of the engine 2, a power supply on request for the engine 2 (request for turning on the power supply to the engine 2).

When the engine control unit receives the request for turning on the power supply from the main CPU 10, in step 37, power is supplied once again from the power supply unit 3 to the engine 2, so that the power of the engine 2 is turned on. In step 38, the engine control unit executes a program to perform an initialization process. When the initialization process ends, in step 39, the engine control unit sends a power supply resume process completion notice to the main CPU 10.

When the main CPU 10 receives the power supply resume process completion notice from the engine control unit, in step 40, the main CPU 10 sends an engine resume completion notice to the service layer, indicating that the engine 2 has switched from the engine-off mode to the regular operation mode. In step 41, the main CPU 10 sends a startup mode setting notice to the service layer for requesting the engine 2 to set modes.

The modes (printing modes) to be set at the engine 2 include a toner save mode to be set when the remaining amount of toner is small, a silent mode for not driving rollers that are not necessary for the time being, a fixing control mode, etc. The type of mode is selected according to the status when the controller 1 causes the engine 2 to switch from the engine-off mode to the regular operation mode.

When the service layer receives the startup mode setting notice from the main CPU 10, in step 42, the service layer sends the startup mode setting notice to the engine control unit.

When the engine control unit receives the startup mode setting notice from the service layer, in step 43, the engine control unit executes a startup mode selection process to select and set the types of modes specified in the startup mode setting notice, and causes the engine 2 to switch from the engine-off mode to the regular operation mode so that printing can be performed. In step 44, the engine control unit sends a startup mode selection process completion notice to the service layer.

Accordingly, the engine 2 switches to a standby status, to be ready to immediately execute a print request from the controller 1.

Meanwhile, in step 45, the sub CPU 21 once again sends, to the main CPU 10, a request for periodically monitoring the main system controlled by the main CPU 10 at predetermined timings, and in step 46, the main CPU 10 returns a reply to the request from the sub CPU 21.

Next, a description is given of a process of returning to the regular operation mode from the STR mode in the image forming apparatus.

Figure 4:
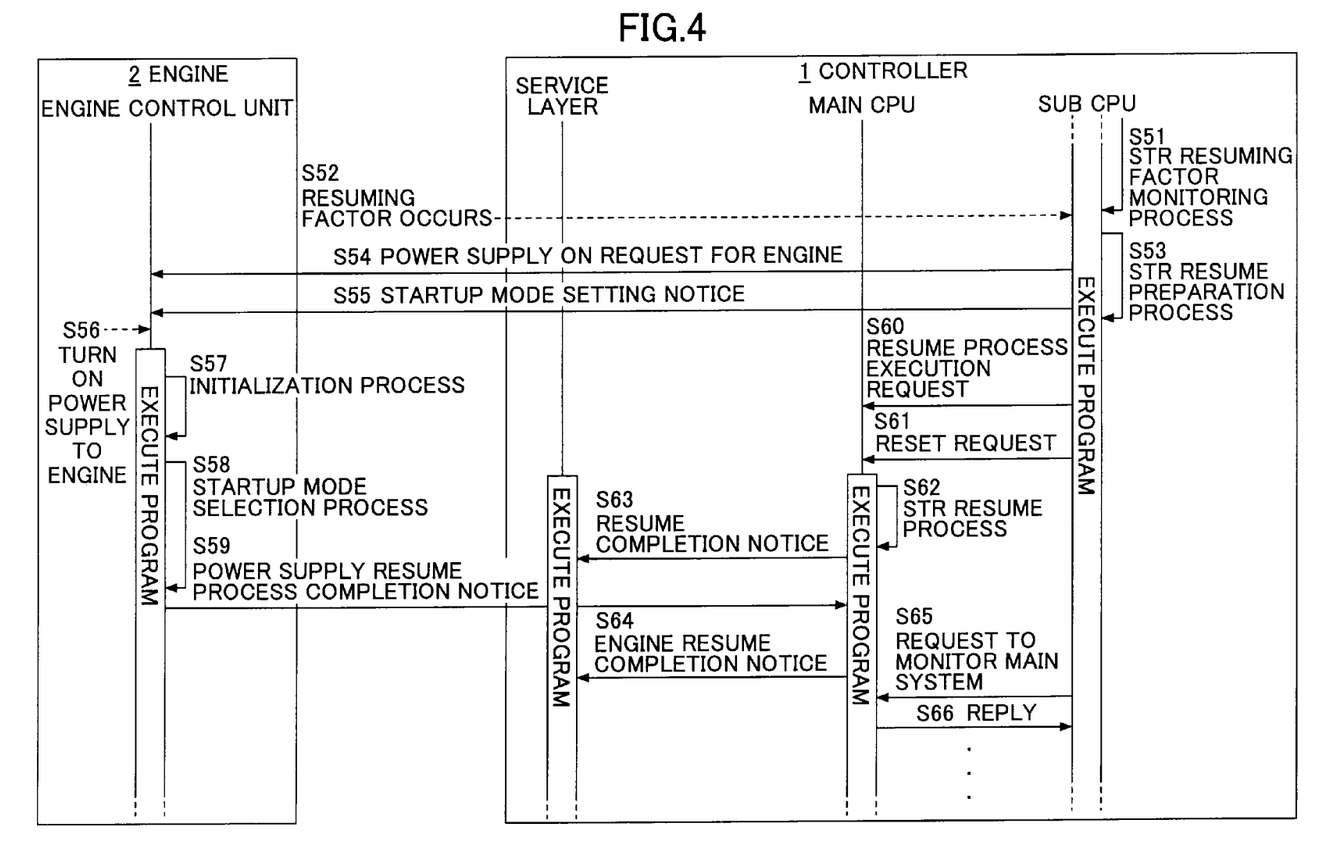
FIG. 4 is a sequence diagram of a process of resuming operation from the STR mode performed by the image forming apparatus shown in FIG. 1.

FIG. 4 is a sequence diagram of the process of resuming operation from the STR mode performed by the image forming apparatus shown in FIG. 1.

Figure 5:
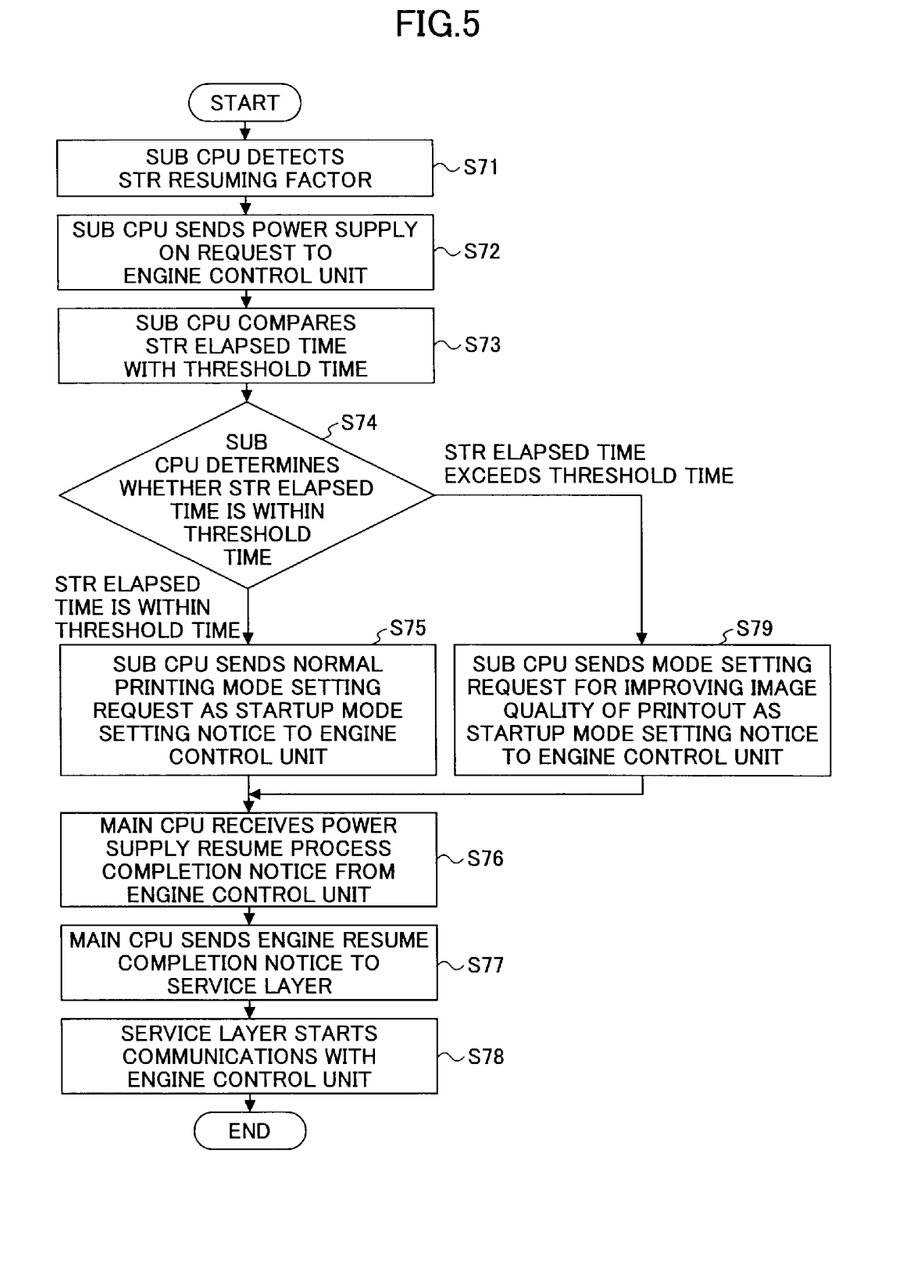
FIG. 5 is a flowchart of the process of resuming operation from the STR mode performed by the image forming apparatus shown in FIG. 1.

FIG. 5 is a flowchart of the process of resuming operation from the STR mode performed by the image forming apparatus shown in FIG. 1.

In the above process, after switching to the STR mode, while the sub CPU 21 is executing an STR resuming factor monitoring process in step 51 of FIG. 4, if the sub CPU 21 detects a resuming factor in step 52 of FIG. 4 (step 71 of FIG. 5) indicating that the various units including the main CPU 10, the service layer, and the engine 2 need to return to the regular operation mode from the STR mode, the sub CPU 21 executes an STR resume preparation process in step 53 of FIG. 4. Examples of the resuming factor are when a print request operation is performed at the operation display unit 26, when an access is made from outside via the network 5 requesting a printing operation, when the engine 2 detects that the platen cover (cover of the exposure glass) for setting an original has been opened/closed, or when a sheet has been inserted into the ADF.

In step 54 of FIG. 4 (step 72 of FIG. 5), the sub CPU 21 sends, to the engine control unit of the engine 2, a power supply on request for the engine 2, before causing the main CPU 10 to resume operation. In step 73 of FIG. 5, the sub CPU 21 compares the STR elapsed time, which is the elapsed time measured from when the image forming apparatus had switched to the STR mode, with a predetermined threshold time. In step 74 of FIG. 5, the sub CPU 21 determines whether the STR elapsed time is within the threshold time. When the STR elapsed time is within the threshold time, in step 75 of FIG. 5 (step 55 of FIG. 4), the sub CPU 21 sends a normal printing mode setting request as a startup mode setting notice to the engine control unit.

The STR elapsed time corresponds to apparatus status information obtained when a resuming factor is detected. In this case, the mode type set at the engine is changed according to whether the STR elapsed time is within the threshold time or whether the STR elapsed time exceeds the threshold time.

The mode type set at the engine can be changed based on the amount of remaining toner and the number of printout sheets.

Meanwhile, when the STR elapsed time exceeds the threshold time, in step 79 of FIG. 5 (step 55 of FIG. 4), the sub CPU 21 sends a mode setting request for improving the image quality of the printout as a startup mode setting notice to the engine control unit.

In the mode for improving the image quality of the printout, the rotational frequency of a drum unit including the photoconductive drum may be increased or the heating temperature of the fixing unit may be increased so that the toner image is fixed to the sheet with good properties.

When the engine control unit receives the power supply on request for the engine 2 and the startup mode setting notice from the sub CPU 21, in step 56 of FIG. 4, power is supplied once again from the power supply unit 3 to the engine 2, so that the power of the engine 2 is turned on. In step 57 of FIG. 4, the engine control unit executes a program to perform an initialization process. When the initialization process ends, in step 58 of FIG. 4, the engine control unit executes a startup mode selection process to select and set the types of modes specified in the startup mode setting notice, so that a printing operation can be performed. In step 59 of FIG. 4, the engine control unit sends a power supply resume process completion notice to the main CPU 10.

In step 60 of FIG. 4, the sub CPU 21 sends a resume process execution request to the main CPU 10 for returning to the regular operation mode from the STR mode, and in step 61 of FIG. 4, the sub CPU 21 sends a reset request to the main CPU 10.

When the main CPU 10 receives the return process execution request from the sub CPU 21, the main CPU 10 executes an STR resume process in step 62 of FIG. 4, and sends a resume completion notice to the service layer in step 63 of FIG. 4.

In step 76 of FIG. 5, when the main CPU 10 receives a power supply resume process completion notice from the engine control unit, in step 77 of FIG. 5 (step 64 of FIG. 4), the main CPU 10 sends an engine resume completion notice to the service layer, indicating that the engine 2 has returned to the regular operation mode. Accordingly, the image forming apparatus returns to the regular operation mode from the STR mode, and the engine 2 switches to a standby status, to be ready to immediately execute a print request from the controller 1.

Then, in step 78 of FIG. 5, the service layer starts communications with the engine control unit.

Furthermore, in step 65 of FIG. 4, the sub CPU 21 once again sends, to the main CPU 10, a request for periodically monitoring the main system controlled by the main CPU 10 at predetermined timings, and in step 66 of FIG. 4, the main CPU 10 returns a reply to the request from the sub CPU 21.

In the above process, the power supply on request for the engine 2 and the startup mode setting notice are sequentially sent to the engine control unit from the sub CPU 21; alternatively, these can be sent simultaneously.

Furthermore, requests to the engine 2 other than the mode setting request are also preferably made before the main CPU 10 resumes operation.

Next, as reference technology, a description is given of a process for resuming operation from the STR mode performed by a conventional image forming apparatus.

Figure 6:
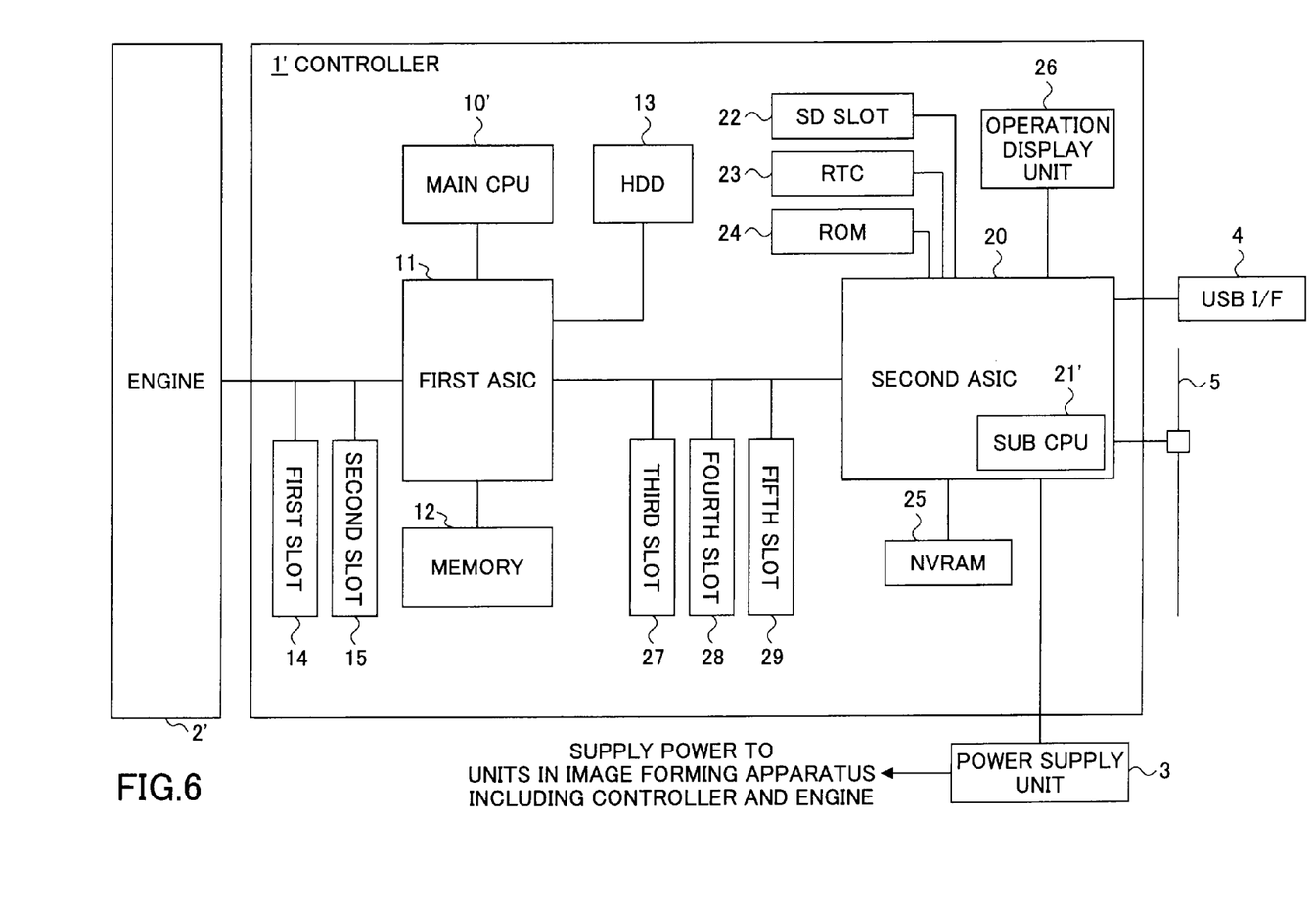
FIG. 6 is a block diagram of a functional configuration of a conventional image forming apparatus.

FIG. 6 is a block diagram of a functional configuration of a conventional image forming apparatus. In FIG. 6, elements corresponding to those in FIG. 1 are denoted by the same reference numbers, and are not further described.

In this conventional image forming apparatus, functions of a main CPU 10' and a sub CPU 21' of a controller 1', and an engine 2' are different from those of the above-described embodiment of the present invention.

Figure 7:
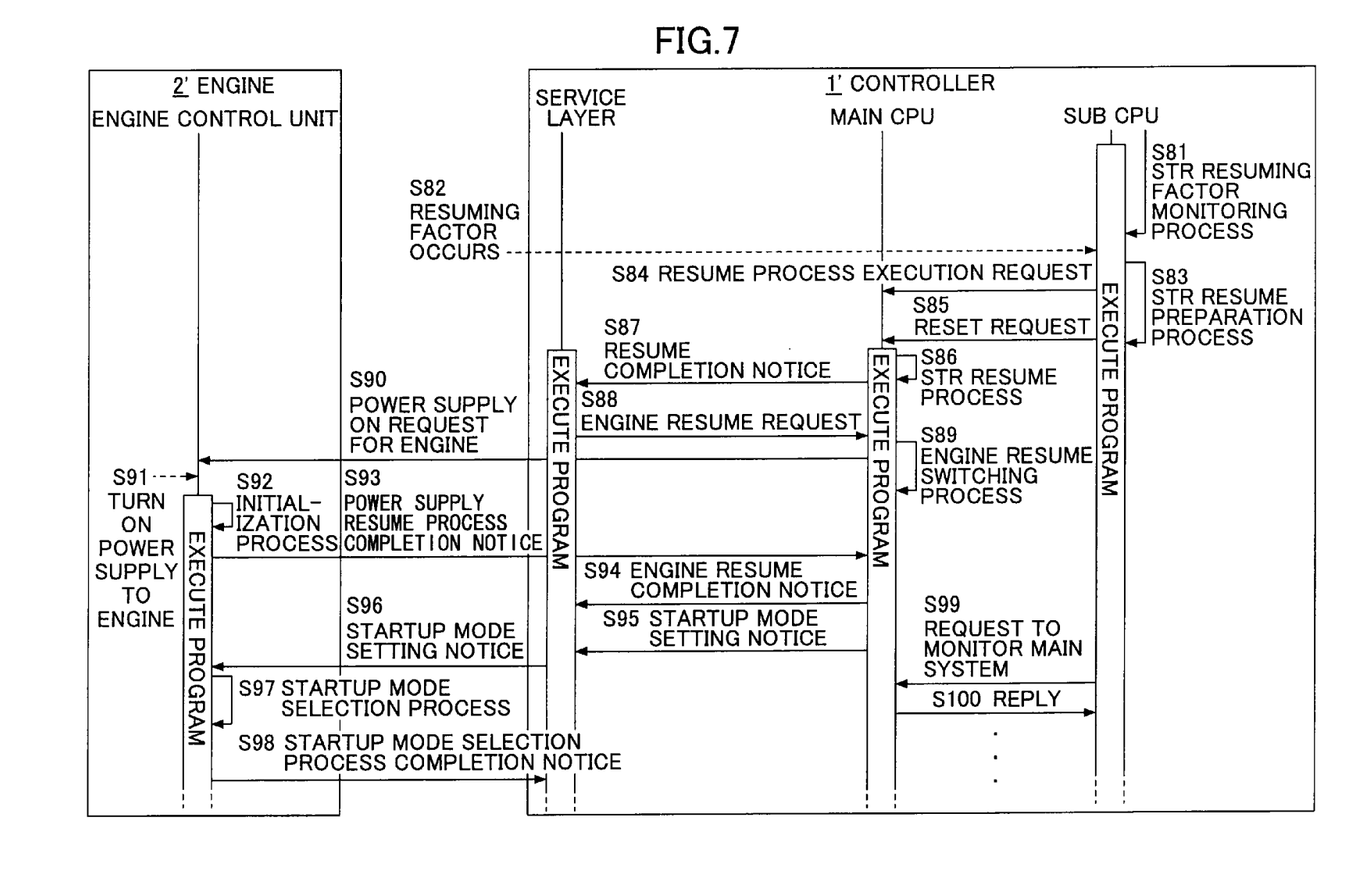
FIG. 7 is a sequence diagram of a process of resuming operation from the STR mode performed by the conventional image forming apparatus shown in FIG. 6.

FIG. 7 is a sequence diagram of the process of resuming operation from the STR mode performed by the conventional image forming apparatus shown in FIG. 6.

Figure 8:
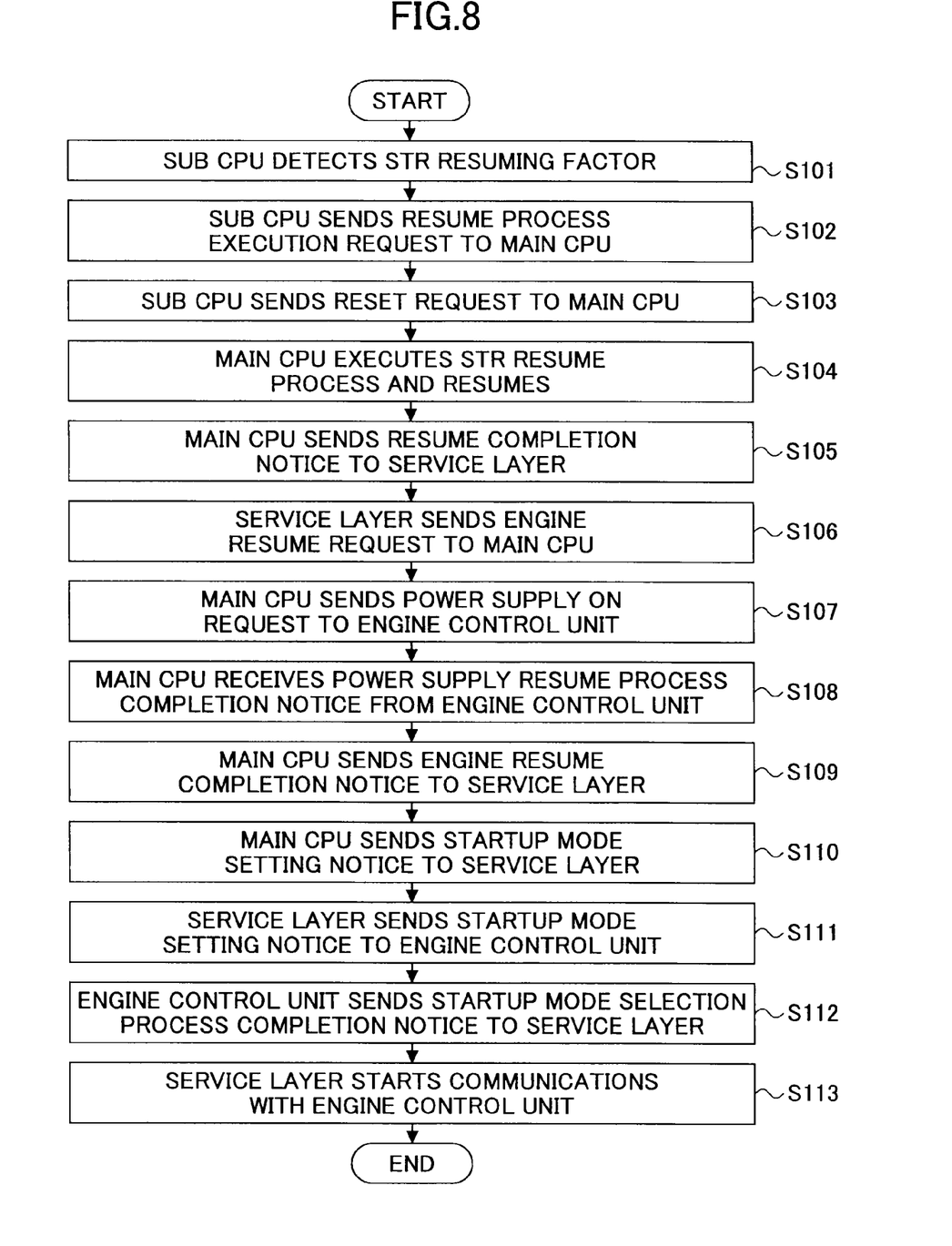
FIG. 8 is a flowchart of the process of resuming operation from the STR mode performed by the conventional image forming apparatus shown in FIG. 6.

FIG. 8 is a flowchart of the process of resuming operation from the STR mode performed by the conventional image forming apparatus shown in FIG. 6.

In the conventional image forming apparatus, after switching to the STR mode, while the sub CPU 21' is executing an STR resuming factor monitoring process in step 81 of FIG. 7, if the sub CPU 21' detects a resuming factor in step 82 of FIG. 7 (step 101 of FIG. 8) indicating that the various units including the main CPU 10', the service layer, and the engine 2' need to return to the regular operation mode from the STR mode, the sub CPU 21' executes an STR return preparation process in step 83 of FIG. 7. Examples of the resuming factor are when a print request operation is performed at the operation display unit 26, when an access is made from outside via the network 5 requesting a printing operation, when the engine 2' detects that the platen cover (cover of the exposure glass) for setting an original has been opened/closed, or when a sheet has been inserted into the ADF.

In step 84 of FIG. 7 (step 102 of FIG. 8), the sub CPU 21' sends a resume process execution request to the main CPU 10', and in step 85 of FIG. 7 (step 103 of FIG. 8), the sub CPU 21' sends a reset request to the main CPU 10'.

In step 86 of FIG. 7 (step 104 of FIG. 8), the main CPU 10' executes an STR return process to resume operation, and sends a return completion notice to the service layer in step 87 of FIG. 7 (step 105 of FIG. 8).

When the service layer sends an engine resume request to the main CPU 10' in step 88 of FIG. 7 (step 106 of FIG. 8), the main CPU 10' executes an engine resume switching process in step 89 of FIG. 7. In step 90 of FIG. 7 (step 107 of FIG. 8), the main CPU 10' sends a power supply on request to the engine control unit.

When the engine control unit of the engine 2' receives the power supply on request from the main CPU 10', the engine control unit turns on the power supply to the engine 2' in step 91 of FIG. 7, executes an initialization process in step 92, and sends a power supply resume process completion notice to the main CPU 10' in step 93 of FIG. 7.

When the power supply return process completion notice is received from the engine control unit in step 108 of FIG. 8, the main CPU 10' sends an engine resume completion notice to the service layer in step 109 of FIG. 8 (step 94 of FIG. 7). In step 110 of FIG. 8 (step 95 of FIG. 7), the main CPU 10' sends a startup mode setting notice to the service layer. In step 111 of FIG. 8 (step 96 of FIG. 7), the service layer sends the startup mode setting notice to the engine control unit.

When the startup mode setting notice is received from the service layer, the engine control unit executes a startup mode selection process in step 97 of FIG. 7, and sends a startup mode selection process completion notice to the service layer in step 98 of FIG. 7.

When the startup mode selection process completion notice is received from the engine control unit, in step 113 of FIG. 8, the service layer starts communications with the engine control unit, so that printing can be performed.

As described above, the image forming apparatus has a so-called power-saving function. Specifically, when an idling status of the apparatus is detected, the apparatus switches to a standby status in a power-saving mode, and when a predetermined resume condition is detected, the apparatus returns to a regular operation mode.

The main system controlled by the main CPU operates for performing typical image forming processes such as a scanning operation, a copying operation, and a printing operation. The sub system controlled by the sub CPU manages the power supply of the main system for the entire apparatus during regular usage, and performs operations for the power-saving mode.

In the power-saving mode, the power of the CPU for the main system is turned off and the sub system monitors network responses and devices. When the apparatus resumes operation from the power-saving mode, the main system resumes operation. With such a configuration, the power consumption can be largely reduced in a system where the CPU consumes a large amount of power.

However, in the conventional image forming apparatus, in order to resume operation from the STR mode, the sub CPU causes the main CPU to resume operation and the main CPU causes the engine to resume operation and to set modes. Thus, the first printing operation is delayed when the apparatus resumes operation from the STR mode.

However, in the image forming apparatus according to an embodiment of the present invention, as described above, in order to resume operation from the STR mode, the sub CPU causes the engine to resume operation before causing the main CPU to resume operation. Therefore, the first printing operation can be quickly performed when the apparatus resumes operation from the STR mode, thereby enhancing convenience for the user.

The image forming apparatus and the control method of the image forming apparatus is applicable to a typical image forming apparatus such as a fax machine, a printer, a copier, and a multifunction peripheral with various functions including a fax communication function, a print function, and a copy function.

According to an aspect of the present invention, there is provided an image forming apparatus including a printing unit configured to print an image onto a recording sheet based on image data; a controlling unit configured to control a print execution process for the printing unit and to control all units of the image forming apparatus; and a monitoring unit configured to monitor, while the printing unit and the controlling unit are in a power-saving mode in which power supply to the printing unit and the controlling unit is stopped, whether there is a resuming factor for resuming operation from the power-saving mode, wherein the monitoring unit includes a requesting unit configured to send, to the printing unit, a request to resume operation and a request to set a printing mode, before sending a request to resume operation to the controlling unit, in the event that the resuming factor is detected.

Additionally, in the image forming apparatus, the request to set the printing mode includes a request to set the printing mode which is selected from plural printing modes in accordance with apparatus status information obtained when the resuming factor is detected.

Additionally, in the image forming apparatus, the apparatus status information includes elapsed time which is measured from when the printing unit and the controlling unit switch to the power-saving mode to when the resuming factor is detected.

Additionally, in the image forming apparatus, the request to set the printing mode includes a request to set a normal printing mode in the event that the elapsed time is shorter than or equal to a threshold time that has been determined beforehand, and a request to set an image-quality-improvement printing mode for improving image quality in the event that the elapsed time exceeds the threshold time.

Additionally, in the image forming apparatus, the printing unit and the monitoring unit are electrically connected so that communications can be performed therebetween.

Additionally, according to an aspect of the present invention, there is provided an image forming apparatus including a printing unit configured to print an image onto a recording sheet based on image data; and a controlling unit configured to control a print execution process for the printing unit and to control all units of the image forming apparatus, wherein while the controlling unit is operating but the printing unit is in a power-saving mode in which power supply to the printing unit is stopped, the controlling unit monitors whether there is a resuming factor for resuming operation from the power-saving mode, and sends, to the printing unit, a request to resume operation and a request to set a printing mode, in the event that the resuming factor is detected.

Additionally, according to an aspect of the present invention, there is provided a control method performed by an image forming apparatus including a printing unit configured to print an image onto a recording sheet based on image data, and a controlling unit configured to control a print execution process for the printing unit and to control all units of the image forming apparatus, the control method including a monitoring step of monitoring, while the printing unit and the controlling unit are in a power-saving mode in which power supply to the printing unit and the controlling unit is stopped, whether there is a resuming factor for resuming operation from the power-saving mode; and a requesting step of sending, to the printing unit, a request to resume operation and a request to set a printing mode, before sending a request to resume operation to the controlling unit, in the event that the resuming factor is detected at the monitoring step.

Additionally, in the control method, the request to set the printing mode includes a request to set the printing mode which is selected from plural printing modes in accordance with apparatus status information obtained when the resuming factor is detected.

Additionally, in the control method, the apparatus status information includes elapsed time which is measured from when the printing unit and the controlling unit switch to the power-saving mode to when the resuming factor is detected.

Additionally, in the control method, the request to set the printing mode includes a request to set a normal printing mode in the event that the elapsed time is shorter than or equal to a threshold time that has been determined beforehand, and a request to set an image-quality-improvement printing mode for improving image quality in the event that the elapsed time exceeds the threshold time.

Additionally, according to an aspect of the present invention, there is provided a control method performed by an image forming apparatus including a printing unit configured to print an image onto a recording sheet based on image data, and a controlling unit configured to control a print execution process for the printing unit and to control all units of the image forming apparatus, the control method including a monitoring step performed by the controlling unit, wherein while the controlling unit is operating but the printing unit is in a power-saving mode in which power supply to the printing unit is stopped, the controlling unit monitors whether there is a resuming factor for resuming operation from the power-saving mode, and sends, to the printing unit, a request to resume operation and a request to set a printing mode, in the event that the resuming factor is detected.

The present invention is not limited to the specifically disclosed embodiment, and variations and modifications may be made without departing from the scope of the present invention.

The present application is based on Japanese Priority Patent Application No. 2007-310207, filed on Nov. 30, 2007, the entire contents of which are hereby incorporated herein by reference.

What is claimed is:

1. An image forming apparatus comprising:
a printing unit configured to print an image onto a recording sheet based on image data;
a controlling unit configured to control a print execution process for the printing unit; and
a monitoring unit configured to monitor, while the printing unit and the controlling unit are in a power-saving mode in which power supply to the printing unit and the controlling unit is stopped, whether there is a resuming factor for resuming operation from the power-saving mode,
wherein:
the monitoring unit comprises a requesting unit configured to send, to the printing unit, an operation resuming request to resume operation and a printing mode setup request to set a printing mode for the printing unit, before sending an operation resuming request to resume operation to the controlling unit, in the event that the resuming factor is detected.

2. The image forming apparatus according to claim 1, wherein:
the printing mode setup request comprises a request to select the printing mode from plural printing modes in accordance with apparatus status information obtained when the resuming factor is detected.

3. The image forming apparatus according to claim 2, wherein:
the apparatus status information comprises elapsed time which is measured from when the printing unit and the controlling unit switch to the power-saving mode to when the resuming factor is detected.

4. The image forming apparatus according to claim 3, wherein:
the printing mode setup request comprises a request to set a normal printing mode in the event that the elapsed time is shorter than or equal to a predefined threshold time, and a request to set an image-quality-improvement printing mode for improving image quality in the event that the elapsed time exceeds the threshold time.

5. The image forming apparatus according to claim 1, wherein:
the printing unit and the monitoring unit are electrically and directly connected so that communications can be performed therebetween.

6. A control method performed by an image forming apparatus comprising a printing unit configured to print an image onto a recording sheet based on image data, and a controlling unit configured to control a print execution process for the printing unit, the control method comprising:
a monitoring step of monitoring, while the printing unit and the controlling unit are in a power-saving mode in which power supply to the printing unit and the controlling unit is stopped, whether there is a resuming factor for resuming operation from the power-saving mode; and
a requesting step of sending, to the printing unit, an operation resuming request to resume operation and a printing mode setup request to set a printing mode for the printing unit, before sending an operation resuming request to resume operation to the controlling unit, in the event that the resuming factor is detected at the monitoring step.

7. The control method according to claim 6, wherein:
the printing mode setup request comprises a request to select the printing mode from plural printing modes in accordance with apparatus status information obtained when the resuming factor is detected.

8. The control method according to claim 7, wherein:
the apparatus status information comprises elapsed time which is measured from when the printing unit and the controlling unit switch to the power-saving mode to when the resuming factor is detected.

9. The control method according to claim 8, wherein:
the printing mode setup request comprises a request to set a normal printing mode in the event that the elapsed time is shorter than or equal to a predefined threshold time, and a request to set an image-quality-improvement printing mode for improving image quality in the event that the elapsed time exceeds the threshold time.

* * * * *